United States Patent
Claussen et al.

(10) Patent No.: US 12,139,177 B1
(45) Date of Patent: Nov. 12, 2024

(54) ENERGY RECOVERY SYSTEM FOR DIESEL LOCOMOTIVES

(71) Applicant: Knoxville Locomotive Works, Inc., Knoxville, TN (US)

(72) Inventors: Pete Claussen, Knoxville, TN (US); Scott Gatewood, Knoxville, TN (US)

(73) Assignee: Knoxville Locomotive Works, Inc., Knoxville, TN (US)

( * ) Notice: Subject to any disclaimer, the term of this patent is extended or adjusted under 35 U.S.C. 154(b) by 904 days.

(21) Appl. No.: 17/088,888

(22) Filed: Nov. 4, 2020

Related U.S. Application Data

(60) Provisional application No. 62/967,274, filed on Jan. 29, 2020.

(51) Int. Cl.

| | |
|---|---|
| *B61C 17/06* | (2006.01) |
| *B61C 3/00* | (2006.01) |
| *B61C 5/00* | (2006.01) |
| *H02K 7/00* | (2006.01) |
| *H02K 9/18* | (2006.01) |
| *H02K 11/00* | (2016.01) |
| *H02K 11/05* | (2016.01) |
| *B60K 6/46* | (2007.10) |
| *B60L 1/00* | (2006.01) |

(52) U.S. Cl.
CPC ............. *B61C 17/06* (2013.01); *B61C 3/00* (2013.01); *B61C 5/00* (2013.01); *H02K 7/006* (2013.01); *H02K 9/18* (2013.01); *H02K 11/0094* (2013.01); *H02K 11/05* (2016.01); *B60K 6/46* (2013.01); *B60L 1/003* (2013.01); *B60L 2200/26* (2013.01); *B60L 2210/10* (2013.01); *B60L 2210/30* (2013.01); *B60Y 2200/31* (2013.01); *B60Y 2200/92* (2013.01)

(58) Field of Classification Search
CPC .. B61C 17/06; B61C 3/00; B61C 5/00; B61C 3/02; B61C 7/00; B61C 9/24; B61C 9/38; B61C 7/04; H02K 11/05; H02K 7/006; H02K 9/18; H02K 11/0094; B60L 11/1809
See application file for complete search history.

(56) References Cited

U.S. PATENT DOCUMENTS

| | | |
|---|---|---|
| 6,737,822 B2 | 5/2004 | King |
| 7,231,877 B2 | 6/2007 | Kumar |
| 7,304,445 B2 | 12/2007 | Donnelly |
| 7,309,929 B2 | 12/2007 | Donnelly et al. |
| 7,723,932 B2 | 5/2010 | King et al. |
| 7,891,302 B2 | 2/2011 | Bachman |
| 7,940,016 B2 | 5/2011 | Donnelly et al. |

(Continued)

OTHER PUBLICATIONS

Yasuhiro Nagaura et al., Battery-powered Drive Systems: Latest Technologies and Outlook, Hitachi Review vol. 66, No. 2, Featured Articles II, 2017.

*Primary Examiner* — Syed O Hasan
(74) *Attorney, Agent, or Firm* — Luedeka Neely, P.C.

(57) ABSTRACT

An energy recovery system for locomotives having a diesel engine to provide power for propulsion and also having non-propulsion electrical devices. The system includes a primary power battery to supply power to the non-propulsion electrical devices. The primary power battery is in electrical communication with a traction motor of the locomotive configured to send power to the primary power battery when the locomotive is coasting or braking.

9 Claims, 2 Drawing Sheets

(56) References Cited

U.S. PATENT DOCUMENTS

| | | |
|---|---|---|
| 8,136,454 B2 | 3/2012 | Barbee et al. |
| 8,196,518 B2 | 6/2012 | Bachman |
| 8,640,629 B2 | 2/2014 | Barbee et al. |
| 9,751,540 B2 | 9/2017 | Cook |
| 10,030,566 B2 | 7/2018 | Filippone |
| 10,544,753 B2 | 1/2020 | Filippone |
| 2008/0121136 A1 | 5/2008 | Mari et al. |
| 2010/0039054 A1 | 2/2010 | Young et al. |
| 2011/0113982 A1* | 5/2011 | Bachman ............... B60L 1/02 105/27 |
| 2013/0239913 A1 | 9/2013 | Young et al. |
| 2014/0346287 A1* | 11/2014 | Billig ............... B61L 3/127 62/48.1 |
| 2015/0032301 A1* | 1/2015 | Lamba ............... B60L 58/20 701/19 |
| 2016/0193928 A1* | 7/2016 | Shirk ............... B60L 50/15 105/27 |
| 2018/0223746 A1 | 8/2018 | Mack et al. |

\* cited by examiner

ENERGY RECOVERY SYSTEM FOR DIESEL LOCOMOTIVES

FIELD

The present disclosure relates to locomotives. More particularly, the disclosure relates to energy recovery systems and diesel locomotives having an energy recovery system that increases operational efficiency and reduces losses associated with non-propulsion operations of the locomotive.

BACKGROUND

Improvement is desired in the efficiency of fuel-electric locomotives and locomotive consists.

For example, fuel-electric locomotives are propelled as by a diesel or gasoline engine rotating a large main generator producing power for use by electric traction motors located on drive wheels. The main generator typically includes a companion alternator attached thereto and configured to produce electrical power for driving non-propulsion electrical devices of the locomotive. These non-propulsion electrical devices can include cooling fans, traction motor blowers, inertial motors and air compressors. These non-propulsion devices can require up to 300 or more horsepower to operate. This additional horsepower requirement must be taken from the brake horsepower supplied by the prime mover engine that is available for use for propulsion of the locomotive. This reduces the horsepower available for propulsion and thus reduces the efficiency of the locomotive.

What is desired is a way to power non-propulsion devices of the locomotive and avoid or reduce the power taken from the diesel or gasoline prime mover engine for this and other non-propulsion purposes of the locomotive.

SUMMARY

The disclosure provides energy efficient locomotives and energy recovery systems for locomotives.

In one aspect, a locomotive according to the disclosure includes a locomotive having a prime mover engine operably associated with a main generator to provide electrical power to a traction motor for propulsion of the locomotive. The locomotive has non-propulsion electrical devices, including cooling fans, traction motor blowers, inertial motors and air compressors.

The locomotive includes a primary power battery operable to supply electrical power to the non-propulsion electrical devices. The primary power battery is in electrical communication with the traction motor of the locomotive. The traction motor is operative to supply electrical power to the primary power battery when the locomotive is coasting or braking and the prime mover engine and main generator are not providing electrical power to the traction motor.

In another aspect, the disclosure provides an energy recovery system for a locomotive having a prime mover engine and a main generator to provide power for propulsion of the locomotive and also having non-propulsion electrical devices.

The energy recovery system includes a primary power battery to supply electrical power to the non-propulsion electrical devices; and a traction motor operable to selectively supply electrical power to the primary power battery. The primary power battery and the traction motor are in electrical communication and the traction motor supplies electrical power to the primary power battery when the locomotive is coasting or braking and the prime mover engine and main generator are not providing electrical power to the traction motor.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
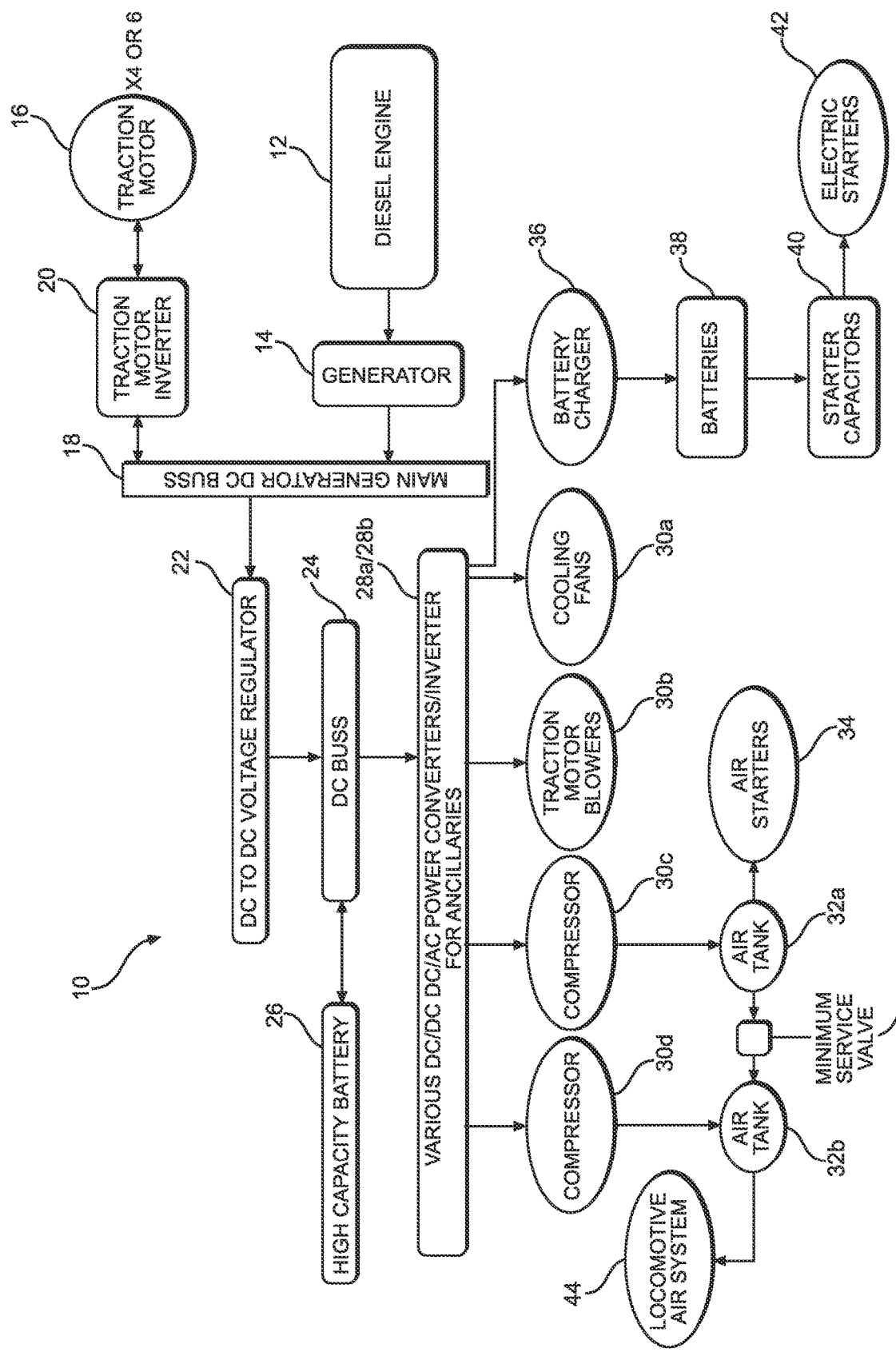
FIG. 1 shows an energy recovery system for a diesel locomotive according to the disclosure.

With initial reference to FIG. 1, there is shown an energy recovery system 10 for fuel-electric locomotives of a locomotive consist according to the disclosure. The system 10 is configured to power non-propulsion devices of the locomotive and avoid or reduce the power taken from a diesel or other prime mover fuel engine associated with the locomotive for this and other non-propulsion purposes of the locomotive. Examples of non-propulsion devices of the locomotive include cooling fans, traction motor blowers, inertial motors and air compressors.

The locomotive utilizes a prime mover engine such as a gasoline or diesel engine 12 which is directly coupled to rotate a main generator 14. The prime mover engine 12 is a conventional locomotive fuel engine, either a diesel or gasoline engine suitable to power the locomotive.

The main generator 14 converts mechanical rotation of the diesel engine 12 into electrical power for traction motors 16 of the locomotive 12 that are geared to driving wheels to propel the locomotive. The main generator 14 produces AC power which is rectified into DC at its output stage. This DC power is fed into a main generator DC buss 18 that traction motor inverters 20 associated with the traction motors 16 connect.

The traction motor inverters 20 convert the DC power to a variable AC voltage and frequency to power the traction motors 16 for propulsion of the locomotive consist. The main generator DC buss 18 generally has between about 600 to 2900 volts depending on the operational state of the diesel engine 12 as dictated by locomotive throttle position or speed.

The system 10 further includes a DC to DC voltage regulator 22 connected to the main generator DC buss 18. The DC to DC voltage regulator 22 functions to convert the variable voltage to a steady lower voltage. The output of the DC to DC regulator 22 is sent to a steady state high voltage DC buss 24.

The output of the high voltage DC buss 24 is directed to a high capacity primary battery 26 and to various AC inverters 28a and DC/DC converters 28b.

The high capacity primary battery 26, preferably a high-density battery, is provided as a source of primary power source for the non-propulsion equipment. With the battery 26 supplying the power for the non-propulsion loads, and in accordance with the disclosure, the horsepower previous used for the electrical loads of the non-propulsion equipment can now be used for propulsion.

In this regard, it is believed that the energy recovery system 10 of the disclosure is capable of returning at least about 5% horsepower for propulsion, thus increasing the efficiency of the locomotive. Thus, as compared to a conventional locomotive, a locomotive configured with the energy recovery system 10 has at least about 5% more horsepower available for propulsion. This is a significant advancement in the field of locomotive energy recovery.

The high capacity battery 26 may be provided by battery of lithium or sodium design and sized to provide power for a predetermined amount of time. The high capacity battery 26 may be utilized to power ancillary devices to reduce the horsepower load on the diesel engine 12 particularly during high traction needs, i.e., starting a locomotive, during acceleration of the locomotive and climbing hills. The high capacity battery 26 includes a disconnect that may be utilized if the locomotive is going into a long period of storage and will maintain its charge for an extended period.

The AC inverters 28a supply electrical power for ancillary components of the locomotive, such as for cooling fan motors 30a, traction motor blowers 30b, air compressors 30c and 30d, and the like. As described below, the fans 30a may be electrical fans or mechanical fans. The compressors 30c and 30d supply air to air tanks 32a and 32b, respectively, having a minimum service or minimum pressure valve 32c, and are linked to air starters 34.

The DC/DC converters 28b supply power for an auxiliary battery charger 36 for maintaining a dedicated starter battery 38 operatively associated with one or more starter capacitors 40 and starter motors 42 configured for starting the diesel engine 12 of the locomotive. In this manner, the locomotive has two redundant systems for enabling starting of the locomotive. This helps avoid the undesirable circumstance of the locomotive being without sufficient stored energy for starting the diesel engine 12. The repeated starting and restarting in short successions causes the starter motors 42 to wear and require frequent overhauls and locomotive down times. The repeated starting and restarting in short successions and the associated draining and deep cycling can shorten the life of the starter battery 38 to approximately one year. The system 10 is configured to advantageously reduce electric starter and battery charge cycling by well over 50%, thus advantageously reducing wear on the starter motors 42 and associated equipment and reduce disadvantageous shortening of the life of the starter battery 38.

Figure 2:
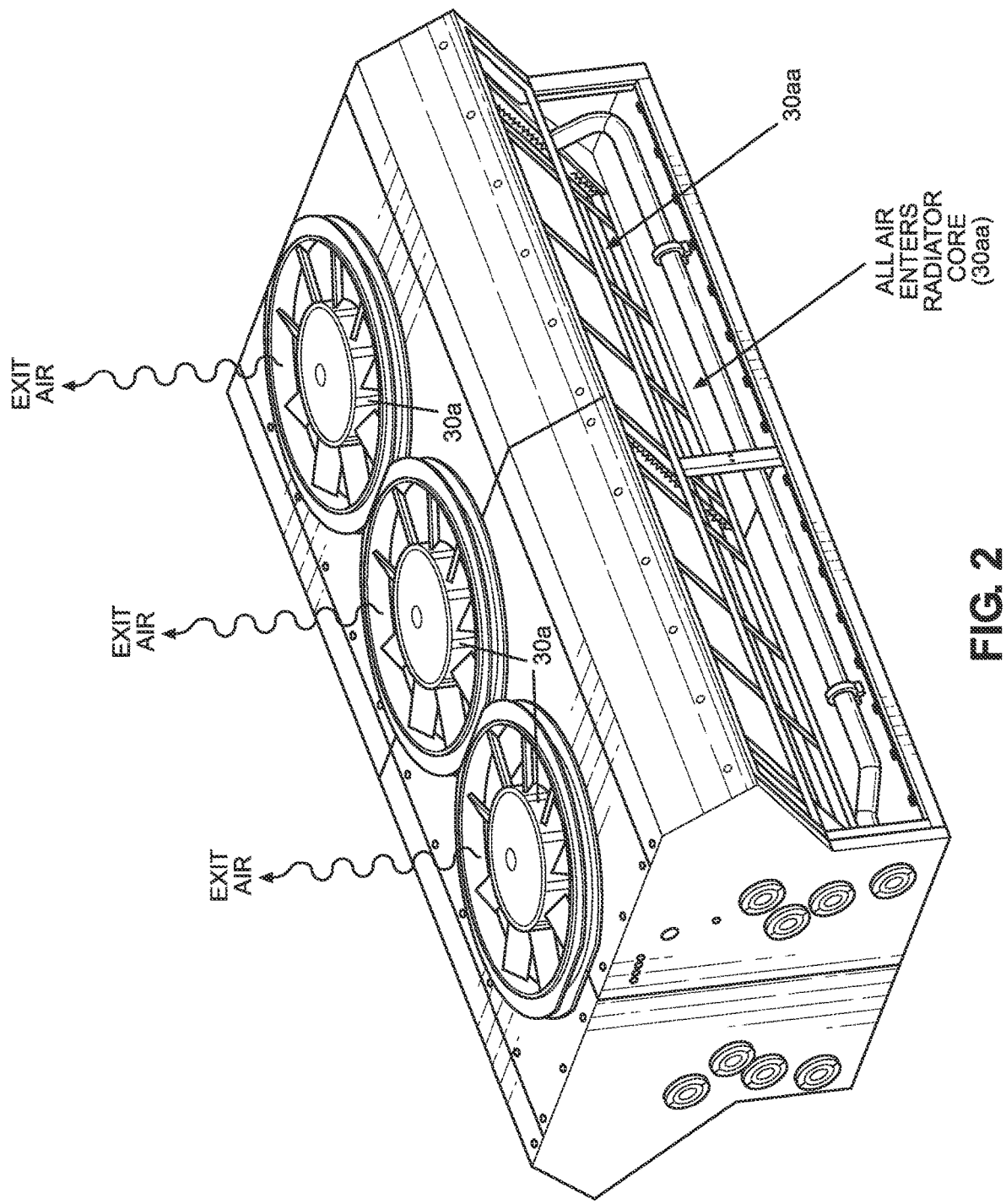
FIG. 2 shows a preferred configuration for cooling fans for use in connection with the energy recovery system of the disclosure.

The AC inverters 28a supply the cooling fans 30a with a variable voltage and frequency to regulate the rotational speed of the cooling fans 30a. A preferred configuration of three of the cooling fans 30a provided as electric fans and mounted above a radiator core 30aa is shown in FIG. 2. When the engine 12 begins to warm up and needs cooling, a computer controller of the locomotive will command all the fans 30a to turn on with a slow rotational speed. The fans 30a will continue to speed up at a rate needed to maintain the engine temperature as high as possible without overheating. The fans 30a are all started at the same time to prevent air from entering through a non-running fan and exiting the running fan and causing reduced air flow through the radiator core 30aa. By running all the fans 30a, the air moved by the fans 30a is routed through the radiator core 30a for more efficient cooling. It is believed that keeping the water temperature as hot as possible keeps the prime mover engine more efficient and prevents the temperature from varying too much and putting strain on the radiators and prime mover engine. Other benefits include saving horsepower and battery drain by only using the horsepower needed for cooling.

The fans 30a may also be mechanical fans. In this regard, an alternative cooling system may utilize a mechanically driven fan powered by the diesel engine 12. Such a fan may be belt driven and have a hub that will allow the fan blades to change pitch and vary the air flow. Changing the pitch will allow the horsepower drawn by the mechanical fans to be varied depending on the cooling needs of the engine. The air may be drawn through louvers in the doors of the locomotive body and pushed into a cooling module containing cooling cores. The cooling module is desirably oriented with the cooling cores on the outlet of the air flow and as a result increase the cooling efficiency. This configuration allows for better temperature control of the locomotive body heat by drawing outside air over the engine and expelling it out the top.

The AC inverters 28a supply the traction motor blowers 30b with a variable voltage and frequency to regulate the speed of the fans 30a provided as electric fans in a similar manner.

Compressor 30c is of a lessor air output flow rate than compressor 30d, and is used to maintain the pressure in air tank 32a for use in starting the locomotive with the air starters 34. Compressor 30d is of a higher air output flow rate and may be used during normal locomotive operations while the engine 12 is running. Compressor 30d is driven by a variable frequency drive to vary the compressor speed according to air consumption. By running the compressor 30d at variable speeds, the required horsepower is decreased which lowers battery drain when the locomotive is running in a battery only ancillary mode.

The air tanks 32a and 32b are separated by the minimum pressure valve 32c which will be set at a lower pressure than the normal operating pressure of about 138 psi. The lower pressure setting will assure some pressure remains in air tank 32a even if the other tank leaks off. Air tank 32a is supplied air from the compressor 30c powered by the high capacity battery 26 thereby keeping the tank fully charged during an Auto Engine Start Stop (AESS) operation of the locomotive.

The charged tank 32a will supply the air for the air starters 34 during start-up and thereby not using the electric starters 42 or any energy from the locomotive starter batteries. Compressor 30c desirably has two main pressure settings, one lower pressure used when in AESS set below the minimum pressure valve 32c, the other pressure setting at normal locomotive operating pressure used while the locomotive is running. When the locomotive is shut down during AESS the compressor pressure setting will be at the lower pressure just to maintain pressure in the first reservoir. When the locomotive starts compressor number one pressure setting will be increased to the higher pressure thereby opening the valve and suppling extra air to compressor number two and adding to the total CFM of the compressor system.

The primary mode of starting the locomotive is by use of the air starters 34. The air starters 34 are fed by the air tank 32a which are monitored during an AESS shutdown and charged by compressor 32c. By having this air reservoir, compressor and starter setup, the electric starters should not need to be used during the stop/start cycles associated with the AESS system. After the locomotive has started for whatever parameter fell out of tolerance the compressor 32c will re-charge all the air tanks and they will be ready for the next start.

The secondary mode of starting will be used if the locomotive has sat for an extended amount of time, the high capacity battery 26 has been depleted or the battery disconnect has been pulled resulting in the air tank 32a being depleted. If the battery disconnect was pulled and the high capacity battery 26 has sufficient charge, its power can be used to refill the tank 32a via the compressor 32c. Another locomotive may be used to supply power for an air start event if available.

If another locomotive is not available then the electric starters 42 may be used. The electric starters 42 will be fed power from the capacitor 40 that is capable of at least two start attempts. If the locomotive does not start after two events the capacitor 40 will be recharged by the lithium battery. The capacitor 40 generally takes about 15 seconds to recharge for another two start attempts. By using the capacitor 40 the starting batteries are not seeing the high amp draw normally seen during starting and reducing stress on the cells. The capacitor charges at a slower rate than the batteries would see during a normal starting event. If the high capacity battery has a charge then it will be suppling most of the power for the capacitors further reducing the stress on the batteries.

Compressor 30d is only used while the locomotive is running and used for a locomotive air system 44. The air from the compressor 30d is fed into the tank 32b and cycles on and off as needed.

The high capacity battery 26 may be charged by four methods when the state of discharge reaches a desired discharge state, such as approximately 30% of battery capacity. The first and main method for charging the battery will be when the locomotive consist is coasting or periods when the throttle setting has been reduced. When the consist is coasting the traction motors 16 will be put into a low-level regeneration mode putting out just enough power to continue to operate any ancillaries that are in use and provide charging current to the high capacity battery 26.

During a throttle reduction there is time before the reduction in engine horsepower and the time when the deceleration match at which time some energy may be captured and put into the high capacity battery 26, or at a minimum, run the ancillaries without draining the high capacity battery 26 any further. The second charging mode comes into play if the locomotive consist has been running where there have not been any coasting or throttle events. In this mode, power is supplied by the main generator DC buss 18, which reduces the power supplied to the traction motors 16.

The third charging mode occurs during dynamic braking in which the battery charging and ancillaries will be powered by the main generator DC buss 18 which is receiving high power produced by the traction motors 16 from the braking effort.

The fourth mode of charging and ancillary operation occurs when the engine 12 is left idling too long and the high capacity battery 26 discharges. The main generator 14 will be excited to supply voltage to the main generator DC buss 18 for charging the battery 26 and supplying power to the high voltage DC buss 24 for operating ancillaries. With the above combination of charging and running the ancillaries off the high voltage DC buss 24 this eliminates the need for a companion alternator and reduces the drag on the engine 12 thus increasing the horsepower available to the traction motors 16.

Accordingly, it will be appreciated that the present disclosure advantageously provides a system configured to power non-propulsion devices and avoid or reduce the power taken from the diesel engine for this and other non-propulsion purposes of the locomotive. In addition, the system overcomes other shortcomings of the prior art to improve efficiency of prior art locomotives.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated.

The invention claimed is:

1. An energy efficient locomotive not having an auxiliary fuel engine, comprising:
a locomotive having a prime mover engine operably associated with a main generator to provide electrical power to a traction motor for propulsion of the locomotive, the locomotive also having non-propulsion electrical devices, comprising cooling fans, traction motor blowers, inertial motors and air compressors; and
a primary power battery operable as the primary source to supply electrical power to the non-propulsion electrical devices and being the only source of electrical power for the non-propulsion electrical devices during operation of the locomotive to avoid taking power from the prime mover engine for non-propulsion purposes of the locomotive when the power from the prime mover engine and main generator are providing electrical power to the traction motor, the primary power battery being in electrical communication with the traction motor of the locomotive, the traction motor being operative to supply electrical power to the primary power battery when the locomotive is coasting or braking and the prime mover engine and main generator are not providing electrical power to the traction motor.

2. The locomotive of claim 1, wherein the prime mover engine is a diesel engine directly coupled to the main generator and the main generator converts mechanical rotation of the diesel engine into electrical power for the traction motor.

3. The locomotive of claim 1, wherein the main generator produces AC power which is rectified into DC power and fed into a main generator DC buss to which a traction motor inverter associated with the traction motor connects.

4. The locomotive of claim 3, further comprising a DC to DC voltage regulator connected to the main generator DC buss and configured to convert variable voltage from the DC to DC voltage regulator to a lower voltage, and further including a high voltage DC buss for receiving electrical output from the DC to DC voltage regulator.

5. The locomotive of claim 4, wherein the output of the high voltage DC buss is directed to the primary power battery and to an AC inverter and a DC/DC converter.

6. The system of claim 5, wherein the AC inverter supplies electrical power for ancillary components of the locomotive, comprising a cooling fan motor, a traction motor blower, and an air compressor; and the DC/DC converter supplies power for an auxiliary battery charger for maintaining a dedicated starter battery operatively associated with one or more starter capacitors and starter motors.

7. The locomotive of claim 1, wherein the cooling fans comprise electric fans and mounted above a radiator core, wherein the electric fans are all operated to prevent air from entering through a non-running electric fan and reducing air flow through the radiator core.

8. An energy recovery system for a locomotive having a prime mover engine and a main generator to provide power for propulsion of the locomotive and not having an auxiliary fuel engine, and also having non-propulsion electrical devices, comprising cooling fans, traction motor blowers, inertial motors and air compressors; the energy recovery system comprising: a primary power battery to supply electrical power to the non-propulsion electrical devices and being the only source of electrical power for the non-propulsion electrical devices during operation of the locomotive to avoid taking power from the prime mover engine for non-propulsion purposes of the locomotive when the power from the prime mover engine and main generator are providing electrical power to the traction motor; and a traction motor operable to selectively supply electrical power to the primary power battery, wherein the primary power battery and the traction motor are in electrical communication and the traction motor supplies electrical power to the primary power battery when the locomotive is coasting or braking and the prime mover engine and main generator are not providing electrical power to the traction motor.

9. A method for powering a locomotive having a prime mover engine whose power output is controlled by a throttle and a main generator to provide power for propulsion of the locomotive and also having non-propulsion electrical devices, the method comprising the steps of:

providing a primary power battery to supply electrical power to non-propulsion electrical devices, comprising cooling fans, traction motor blowers, inertial motors and air compressors; and providing a traction motor operable to selectively supply electrical power to the primary power battery, and placing the primary power battery and the traction motor in electrical communication and operating the traction motor to supply electrical power to the primary power battery when the throttle of the locomotive is reduced and the locomotive is coasting or braking and the prime mover engine and main generator are not providing electrical power to the traction motor, and operating the traction motor for propulsion of the locomotive when the throttle of the locomotive is not reduced and operating the prime mover engine and the main generator to exclusively provide power to the traction motor for propulsion of the locomotive when the throttle of the locomotive is not reduced.

* * * * *